(12) United States Patent
Stevenson et al.

(10) Patent No.: US 6,704,284 B1
(45) Date of Patent: Mar. 9, 2004

(54) MANAGEMENT SYSTEM AND METHOD FOR MONITORING STRESS IN A NETWORK

(75) Inventors: David James Stevenson, Edinburgh (GB); Andrew Hunter Gray, West Lothian (GB); Robert James Duncan, Edinburgh (GB); Alastair Hugh Chisholm, Edinburgh (GB); Vanessa Serra, Edinburgh (GB); Colin Tinto, Edinburgh (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/479,501

(22) Filed: Jan. 7, 2000

(30) Foreign Application Priority Data

May 10, 1999 (GB) .............................................. 9910838
Jul. 30, 1999 (GB) .............................................. 9917993

(51) Int. Cl.[7] .............................................. H04L 12/26
(52) U.S. Cl. ...................................... 370/241; 709/224
(58) Field of Search .................................. 370/229, 241, 370/242, 243, 244, 245; 345/418; 709/200, 223, 224, 310, 315, 316, 318; 714/46, 47, 48, 58

(56) References Cited

U.S. PATENT DOCUMENTS

| 5,615,323 A | * | 3/1997 | Engel et al. ................. 345/440 |
| 5,751,964 A | * | 5/1998 | Ordanic et al. ............. 709/224 |
| 5,819,028 A |   | 10/1998 | Manghirmalani et al. ........................ 395/185.1 |
| 6,182,022 B1 | * | 1/2001 | Mayle et al. ................ 702/182 |
| 6,456,306 B1 | * | 9/2002 | Chin et al. ................... 345/810 |
| 6,502,131 B1 | * | 12/2002 | Vaid et al. ................... 709/224 |
| 2002/0141337 A1 | * | 10/2002 | Grandin et al. ............. 370/229 |

FOREIGN PATENT DOCUMENTS

GB 2 271 918 4/1994 ........... H04L/12/26

* cited by examiner

Primary Examiner—Chi Pham
Assistant Examiner—Derrick W. Ferris
(74) Attorney, Agent, or Firm—McDonnell Boehnen Hulbert & Berghoff

(57) ABSTRACT

A system and method for providing a stress value representing the performance of a network comprising network devices is described. A raw data value for a monitored characteristic of a network device or link is obtained by the management system and compared with a predetermined threshold value for the monitored characteristic. If the raw data value is greater than or equal to said threshold value, the management system provides a stress value equal to a default value, said default value being a maximum or minimum value of a predefined bounded range; and if the raw value is less than said threshold value, the management system calculates a stress value within said predefined bounded range using an appropriate algorithm for said monitored characteristic.

41 Claims, 3 Drawing Sheets

MANAGEMENT SYSTEM AND METHOD FOR MONITORING STRESS IN A NETWORK

BACKGROUND OF THE INVENTION

1. Field of the Invention

The present invention relates to the management of a communications system or network, and more particularly to the monitoring of "stress" in a network.

2. Description of the Related Art

The following description is concerned with a data communications system such as a local area network (LAN), that is an Ethernet network. However, the skilled person will appreciate that the present invention will have more general applicability to other types of managed networks including wireless networks.

A local area network (LAN) typically comprises a plurality of computers, computer systems, workstations and other electronic devices connected together by a common media such as twisted pair or coaxial cable or fibre optic cable. Data can be communicated between devices on the network by means of data packets (or frames) in accordance a predefined protocol.

Computers and other devices connected to a network can be managed or unmanaged devices. A managed device has processing capability which enables it inter alia to monitor data traffic sent from, received at, and passing through the ports of the device. Monitored data associated with the ports of the network device is stored in memory on the network device. Unmanaged devices do not have this processing capability.

It is becoming increasingly common and necessary for an individual to be appointed to manage a network. The appointed network manager (or administrator) utilises a network management station which includes network management hardware and software. In particular, the network management station is able to access management data from managed network devices using an appropriate management protocol (e.g. the SNMP protocol) and display this data for use by the network manager.

Known network management systems simply read the management data from the managed network devices and present this data to the network manager, typically in the form of numeric text, substantially unchanged. The network manager is expected to interpret the data in managing the network.

One of the important tasks of a network manager is to assess the operational performance of the various network devices and links as well as the network as a whole. The network manager needs to know when problems are arising within the network and which particular network devices are responsible for such problems etc.

Typical problems which may affect the performance of a network include:

1. slow operating speed of the network, and individual network devices, leading to slow movement of data traffic across the network, indicated by e.g. slow response time for a given network device;
2. high volumes of data traffic on the network due to e.g. over-utilisation of the network links, network devices and the network as a whole; and
3. high error rates in the transmission of data packets across the network, indicated by e.g. the loss of data packets in a network device and errors in received data packets.

The aforementioned problems which occur in the operation of a network contribute to the poor "health" of a network. The concept of the health of a network is well known in the field of network management. In the present description, however, it is more convenient to refer to the "stress" of a network (or network device or link) rather than its "health". It will be understood that a high level of stress equates to a low level of health and vice versa. Although the present invention is described as monitoring stress in a network, it will be appreciated that the present invention is equally applicable to monitoring health in a network.

Problems which affect the performance of a network, and therefore contribute to the level of "stress", may be of greater or lesser significance. For instance, a problem with the operating speed of an end station may be less significant than a problem with the operating speed of a central core device such as a switch. Thus, the level of stress of a network depends upon a number of factors including device type, network media type and the type of problem occurring. The network manager must take all such factors into account when interpreting the management data received from the managed network devices to establish whether the performance of the network is satisfactory.

It would be desirable for a network management system to monitor characteristics of network devices and links which are indicative of problems occurring in a network which contribute to "stress", (such characteristics are referred to herein as "metrics") and provide data to the network manager indicative of the level of stress which is easy to interpret. It would further be desirable to determine a value indicating the overall performance of each network object (a "network object" is defined herein as a network device or link) on a network and/or the overall performance of parts of, or all of, the network, so that the network manager would not be required to interpret the monitored data, but could immediately ascertain the performance of the network (or part of the network) from the value provided by the network management system.

SUMMARY OF THE INVENTION

In accordance with a first aspect, the present invention provides a method for processing data representing monitored characteristics in a network comprising network devices and links to provide a stress value representing the performance of the network or a part thereof, the method comprising:

obtaining a raw value of data for a monitored characteristic of a network device or link;

comparing said raw value with a predetermined threshold value for said monitored characteristic;

if said raw data value is greater than or equal to said threshold value, providing a stress value equal to a default value, said default value being a maximum or minimum value of a predefined bounded range; and if said raw value is less than said threshold value, calculating a stress value within said predefined bounded range using an appropriate algorithm for said monitored characteristic.

In accordance with a second aspect, the present invention provides a computer readable medium having a computer program for carrying out the method of the first aspect of the present invention.

In accordance with a third aspect the present invention provides network management apparatus for processing data representing monitored characteristics in a network comprising network devices and links to provide a stress value representing the performance of the network, the apparatus comprising:

a network connection or port for receiving a raw value of data for a monitored characteristic of a network device or link;

a processor for comparing said raw value with a predetermined threshold value for said monitored characteristic obtained from memory; and if the comparison determines that raw data value is greater than or equal to said threshold value, providing a stress value equal to a default value, said default value being a maximum or minimum value of a predefined bounded range; and if the comparison determines that said raw value is less than said threshold value, calculating a stress value within said predefined bounded range using an appropriate algorithm for said monitored characteristic stored in memory.

The present invention thus obtains a value for the stress of a network, network object or part thereof, within a predefined, bounded range, that is to say a "normalised" stress value. Since the stress value is a normalised value, is easy to understand, and requires no interpretation by the network manager.

BRIEF DESCRIPTION OF THE DRAWINGS

Embodiments of the present invention will now be described, by way of example, with reference to the accompanying drawings, in which.

DETAILED DESCRIPTION OF THE PREFERRED EMBODIMENTS

Figure 1:
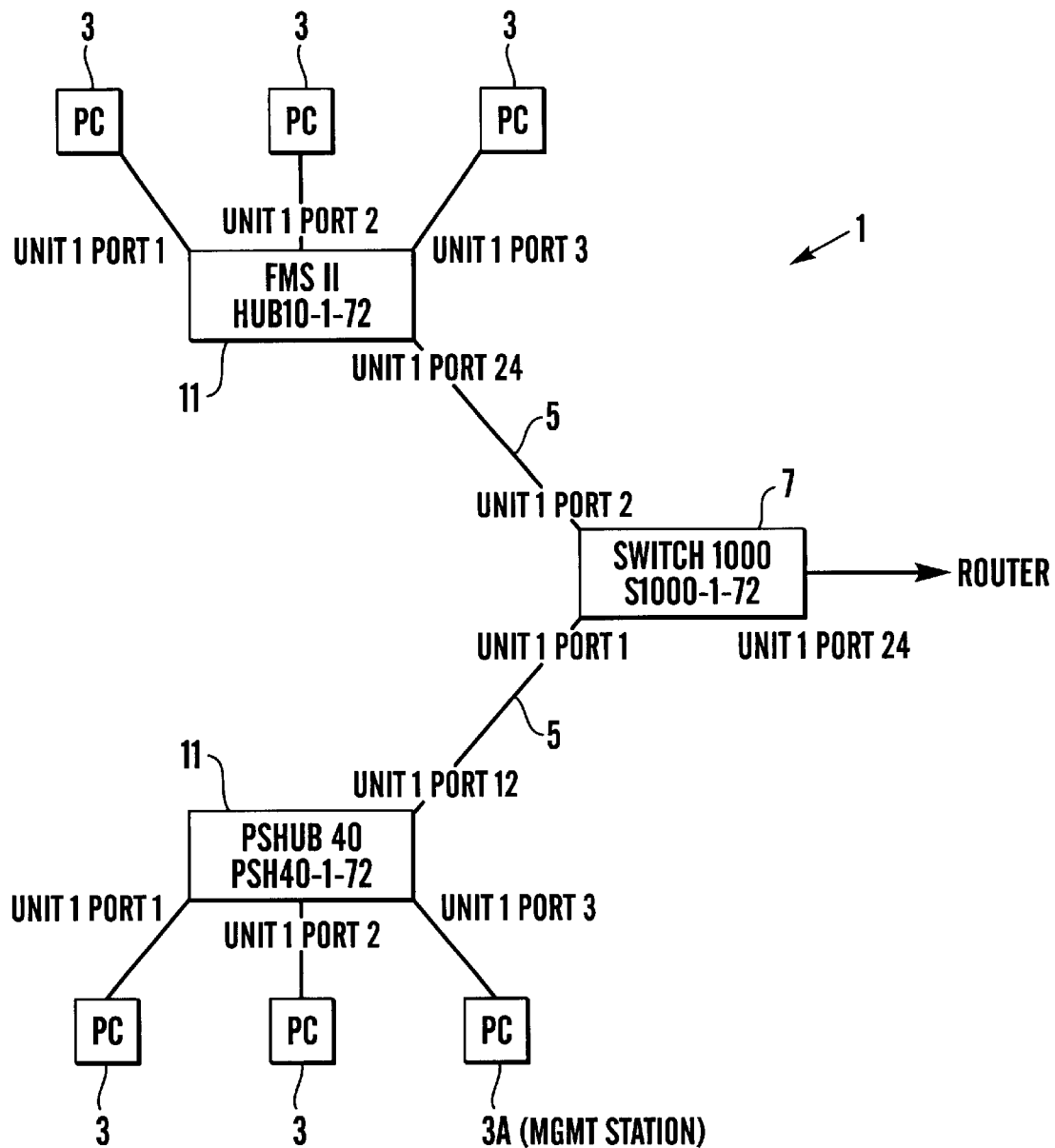
FIG. 1 is a block diagram of a typical network having a network management system according to a preferred embodiment of the present invention.

FIG. 1 shows a typical network 1 incorporating a network management system according to a preferred embodiment of the present invention. The network 1 includes a network management station 3A which incorporates the necessary hardware and software for network management. In particular, the network management station includes a processor, a memory and a disk drive, and preferably also a modem for internet access, as well as user interfaces such as a keyboard and mouse, and a visual display unit. Network management application software in accordance with the present invention is loaded into the memory of management station 3A for processing data as described in detail below. The network management station 3A is connected by network media links 5 to a plurality of managed network devices including core devices such as network switch 7, hubs 11, a router (not shown) and end stations, which may be managed or unmanaged, including personal computers 3 and workstations. The network may also include unmanaged devices, for example peripheral devices such as printers etc.

The network management station 3A is capable of communicating with the managed network devices such as network switch 7 and hubs 11 by means of a network management protocol (e.g. the SNMP protocol) in order to obtain network management data. Each managed device includes a processor which monitors and stores data in memory on the device, and such data may be represented to an external management station by a MIB (management information base), as is well known in the art, including data relating to inter alia data traffic at the device. A typical managed device monitors data contained in a number of MIBs, (of which one or more contains data used in the present invention). An example of a MIB containing network management data is MIB-II (formerly MIB-I) as specified by the IETF (Internet Engineering Task Force) in specification RFC1213. MIB-II is common to most vendors' core devices and any network management system should preferably be capable of reading and utilising management data from MIB-II. Furthermore, the network management system of the preferred embodiment of the present invention is additionally capable of reading and utilising more complex management data contained in such MIBs as RMON (Remote Monitoring MIB, RFC1271), RMON2 (Remote Monitoring MIB 2, RFC2021), the standard bridge MIB (RFC1493), the standard repeater MIB (RFC1516), or any proprietary MIBs produced by original equipment manufacturers (e.g. the 3Com Remote Poll MIB).

In accordance with the preferred embodiment of the present invention, the network management station 3A obtains data about a certain metric for a network object which is indicative of the level of "stress" of the network object. For example, the station 3A may request from a managed device, such as switch 7, a single piece of information (called an "object instance" or SNMP variable) from a MIB about a particular state of the device such as the current error rate in data packets sent from and received at one of its ports. In accordance with the present invention, the data obtained from the MIB is processed using a predetermined "mapping algorithm" for error rate in a port of the switch to obtain a "normalised" stress value (as explained in more detail below). The normalised stress value may be displayed on the visual display unit of the network management station or otherwise communicated to the network manager, e.g. via a printer or through another application such as a word processing application. The normalised stress value represents the perceived level of stress of the network device (i.e. a level which takes into account all relevant factors including the type and location of the network device) which can be readily understood by the network manager as indicating whether the level of stress is acceptable.

The network management system may also obtain metric data for a network object without accessing a MIB in a managed device. For example, the network management station 3A may send a signal to a device over a link which prompts a response from the device (e.g. by IP ICMP echo or IP Ping, as is known in the art). The network management station will itself then monitor the time taken to receive a response from the device. The normalised stress value is then determined using a predetermined "mapping algorithm" for the monitored metric.

The following tables represent examples of the information/characteristics which the network management system, according to the preferred embodiment of the present invention, monitors. In the tables, the monitored information/characteristic is called a "metric" and the typical level of the raw measured value which represents an unacceptably high level of stress (i.e. poor performance) is called the "default threshold". The default threshold is set by the vendor of the network management system but may adjustable by the user, if required.

Examples of metrics obtained by the network management station from a network device are shown in Table 1.

These stress metrics are examples of characteristics monitored by the network management system to ensure that parts of the network devices (i.e. discrete hardware or software components) are operating in an acceptable fashion.

TABLE 1

| metric | typical default threshold |
| --- | --- |
| IP Ping response time | 1000 milliseconds |
| DNS response time | 1000 milliseconds |
| FTP response time | 1000 milliseconds |
| HTTP response time | 1000 milliseconds |
| POP3 response time | 1000 milliseconds |
| SMTP response time | 1000 milliseconds |
| NFS response time | 1000 milliseconds |

(Note that not all devices will have all of the functions indicated by the metric. The network management station of the preferred embodiment only sends signals appropriate for each network device to obtain the metrics for that device).

Examples of metrics obtained by the network management station requesting information contained in a MIB in a managed network device such as switch 7 are shown in Table 2. These stress metrics are examples of the characteristics monitored in a core device to determine whether errors and bottlenecks of data traffic (due to excessive traffic) are occurring in the device.

TABLE 2

| metric | typical default threshold |
| --- | --- |
| frames discarded due to excessive delay | 0 frames per second |
| frames discarded due to MTU exceeded | 0 frames per second |
| frames discarded because filtering table full | 0 frames per second |
| rate of topology changes | 0 per second |

(Note that the metrics listed in Table 2 are monitored and stored in most layer 2 switching devices such as bridges or switches.)

Examples of metrics obtained by the network management station from a network device such as a half duplex Ethernet interface or port on a network device are shown in Table 3. These stress metrics are examples of characteristics monitored to identify problems occurring at the ports of network devices such as over-utilisation of the link connected to the port.

TABLE 3

| metric | typical default threshold |
| --- | --- |
| link utilisation | 35% bandwidth |
| link error rate | 5% all frames |
| collisions | 20 per second |
| broadcast frames | 3000 per second |

(Note that the metrics listed in Table 3 are monitored and stored for each port in most managed network devices which support a MIB capable of monitoring traffic flow on a port (e.g. MIB-II, RMON, repeater MIB, or a similar operating MIB).)

Finally, an example of a metric obtained by the network management station requesting data from a managed network device which supports a proprietary MIB, for example a MIB of 3Com Corporation, is response time from far end of link, which has a typical default threshold of 1000 milliseconds. The network management station requests from the network device this data, and the processor in the network device sends a signal to the far end of the link and times the period for a response to be received. The monitored response time is then provided to the management station as a raw value indicative of problems relating to the speed of transmission of data across the network.

A normalised stress value is determined by the network management system of the preferred embodiment using an appropriate algorithm as discussed in more detail below, based on a) the characteristics of the information being requested; b) the type of managed device being monitored, and c) the type of media to which the device is attached. In the embodiment, the stress value is "normalised" for all stress metrics within a predefined, bounded range. In the preferred embodiment the range is 0–100 where 100 is an unacceptable level of stress. As mentioned previously, the stress value for each metric is determined using an appropriate "stress mapping" algorithm which considers the aforementioned factors a) to c) to provide an appropriate level of perceived stress in the range 0 to 100 to the user. In particular, the stress mapping applied to any monitored value will always return a stress value in the same range i.e. 0 to 100. The stress mapping algorithms for all monitored values (i.e. all metrics for all network objects) are designed such that a given reported stress value always has the same meaning for the user, no matter which raw monitored value (i.e. metric) was used to generate the stress value. A better understanding of the manner of implementation of the stress mapping algorithms, which are predetermined by the vendor of the network management system, will be appreciated from Examples 1 and 2.

EXAMPLE 1

First Stress Metric—Link Utilisation

The network management station 3A requests from the network switch 7 a numerical value (or object instance) in MIB-II (and also in RMON) for determining the link utilisation at a particular port of the switch 7. As is well known in the art, the processor in switch 7 will monitor the numbers of data packets and bytes which are transmitted from and received at each of its ports and store this data in memory as an appropriate MIB. The network management station 3A receives the MIB data for a particular port and therefore the link connected to the port, and knowing: the type of link and its state of operation, and therefore its bandwidth; and, the elapsed time since the last request and the last requested value, and hence the traffic rate since the last request; determines the % utilisation of the link. The % utilisation of bandwidth of the link is referred to below as the "utilisation value" and is a "raw value" (i.e. before stress mapping).

The network management station then compares the utilisation value with the default threshold for the link stored in its memory (e.g. 35% bandwidth in accordance with Table 3). If the utilisation value exceeds or equals the default threshold then the stress value is determined to be the maximum stress value i.e. 100, indicating an unacceptably high level of stress. If the utilisation value is below the default threshold then the processor utilises an appropriate stress mapping algorithm to determine the stress value within the range 0 to 100 corresponding to the utilisation value.

Figure 3:
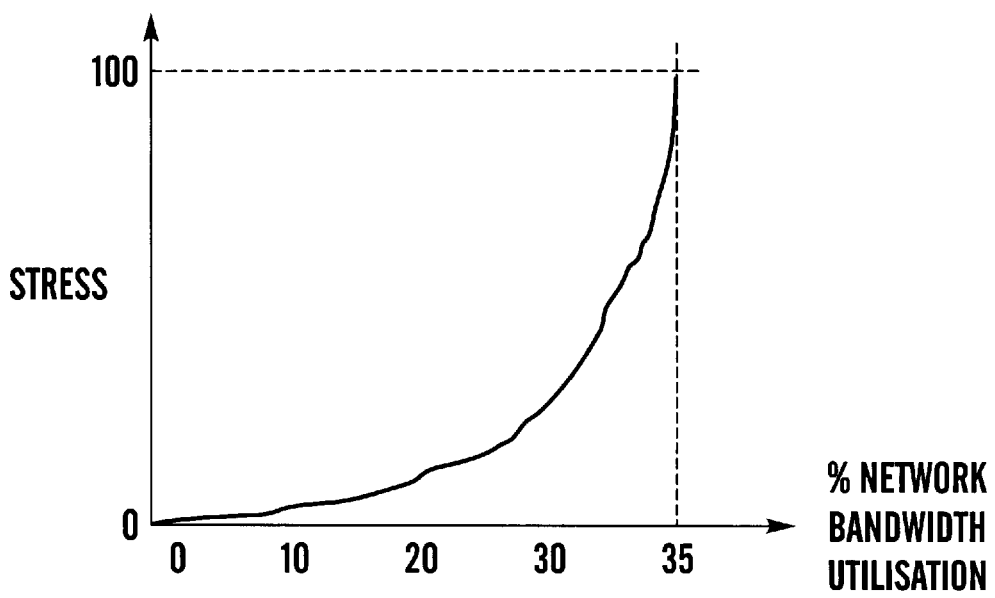
FIG. 3 is a stress mapping graph for a second stress metric which may be monitored by the network management system in accordance with the present invention.

The relationship between the utilization value and the perceived level of stress is non-linear. The stress mapping for link utilization may be represented as shown in FIG. 3. As can be seen from this graph, the perceived stress on the network link increases dramatically from about 30% to an unacceptable level at 35% bandwidth utilized (the default threshold in Table 3). Thus 35% bandwidth utilization or greater equates to the maximum stress value 100 as explained above.

At levels below 35% bandwidth utilisation, the non-linear relationship between link utilisation and perceived stress may be represented by key points as shown in Table 4.

TABLE 4

| raw value | stress (0 to 100) |
| --- | --- |
| 0 | 0 |
| 5 | 1 |
| 8 | 2 |
| 10 | 5 |
| 20 | 10 |
| 25 | 20 |
| 30 | 30 |
| 32 | 50 |
| 35 | 100 |

The implementation of the stress mapping algorithm extrapolates these key points to determine the appropriate stress value between 0 and 100 for any raw value (utilisation value).

EXAMPLE 2

Second Stress Metric—Link Error

The network management station 3A requests from the network switch 7 the number of error frames received at a certain port and the number of data packets received at that port. This data is contained in a MIB of the switch 7 such as MIB-II, RMON, or a similar standard or proprietary MIB. As is well known in the art, the processor in switch 7 keeps a count of the number of data packets which are received at each of its ports, and the number of data packets received in error at each of its ports, and stores this data as an appropriate MIB. The network management station 3A receives the aforementioned MIB data for a particular port and knowing the elapsed time since the last request and the last requested values, determines the % data packets in error on the link. The % data packets in error on the link, i.e. the error rate, is referred to below as the "error value" and is a "raw value" (i.e. before stress mapping).

The network management station then compares the error value with the default threshold for errors on the particular link stored in its memory (e.g. 5% frames in error in accordance with Table 3). If the error value exceeds or equals the default threshold then the stress value is determined to be the maximum stress value i.e. 100, indicating an unacceptably high level of stress. If the error value is below the default threshold then the processor utilises an appropriate stress mapping algorithm to determine the stress value within the range 0 to 100 corresponding to the error value.

Figure 2:
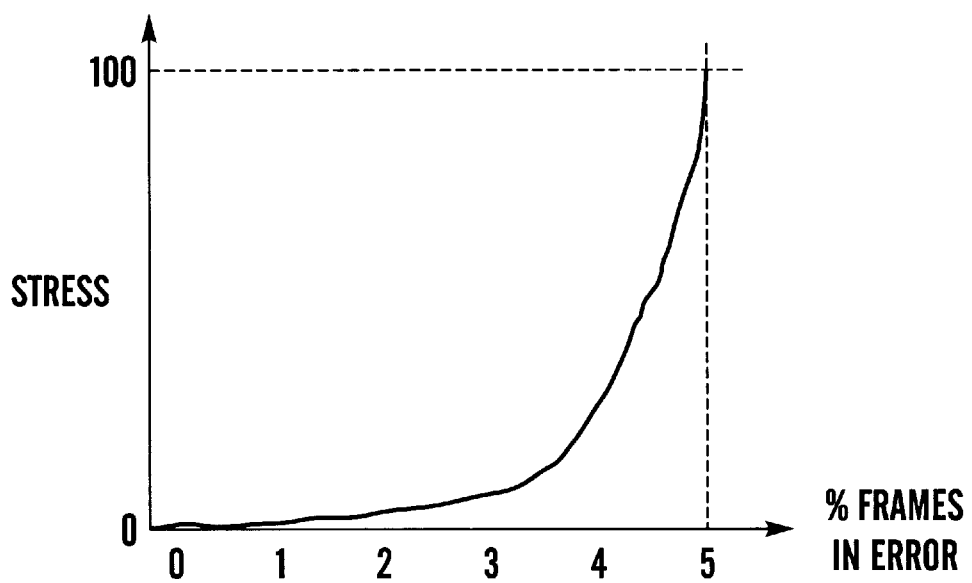
FIG. 2 is a stress mapping graph for a first stress metric which may be monitored by the network management system in accordance with the present invention.

The relationship between the error value the perceived level of stress is non-linear. The stress mapping for link error may be represented as shown in FIG. 2. As can be seen from this graph, the perceived stress on the network link increases dramatically from about 4% error rate to an unacceptable level at 5% frames in error (the default threshold in Table 3). Thus 5% error or greater equates to the maximum stress value of 100.

At levels below 5% error, the non-linear relationship between % frames in error and perceived stress may be represented by key points as shown in Table 5.

TABLE 5

| raw value | stress (0 to 100) |
| --- | --- |
| 0 | 0 |
| 1 | 1 |
| 2 | 2 |
| 3 | 5 |
| 4 | 30 |
| 5 | 100 |

The implementation of the stress mapping algorithm in the network management station extrapolates the key points in the stress mapping shown in Table 5 to obtain a stress value within the range 0 to 100 corresponding to any raw value (i.e. error value).

In accordance with the preferred embodiment of the present invention, the network management station 3A stores in memory the stress mapping algorithms and default thresholds for all stress metrics monitored in the management system. The processor of the network management station running the application software carries out the steps shown in FIG. 4. At step 101 the program obtains for a particular network object a raw data value (or object instance) for a given metric and in step 102 compares it to the default threshold. If in step 103 it is found that the raw data value is greater than or equal to the default threshold, a default condition arises whereby the processor determines that the stress value is a default value in step 104, which in the preferred embodiment is a maximum (i.e. 100). Otherwise, the processor retrieves the appropriate algorithm for the metric in step 105 and calculates the normalised stress value (i.e. between 0 and 100) in step 106.

The thus determined stress value represents meaningful information to the network manager since it is normalised within a predetermined range. If the normalised stress value is then sent to a display unit in step 107 to be displayed or to a printer to be printed e.g. as a number on the visual display unit of the network management station, together with a large number of other normalised stress values, the network manager can simply look for high numbers (say above 50) to detect potential problems. Accordingly, by utilising "stress-mapping" to determine a normalised stress value for each metric of a network object, the network manager can compare the stress of different areas of a device or different parts of the network and be able to judge which areas need the most urgent attention, without the need to analyse the data for each device to determine whether it has a relatively high stress level for the type of device, the type of media link and the operating state of the link.

The network management system in accordance with the preferred embodiment of the present invention is designed to monitor a plurality of different stress metrics for each network object. The system retrieves the monitored data for some or all of the metrics appropriate to a given network object and aggregates the data to form an overall object stress value as explained below. This enables the user to view the data for an individual network object and ascertain its overall performance.

For instance, the stresses of a plurality of individual stress metrics of a network device are monitored and the data obtained is aggregated to form an overall device stress value.

A network device such as switch 7 is typically composed of the following components:

a stackable backplane of some kind to which individual units (i.e. switches, routers etc) may be attached;

a bus within each unit into which blades can be inserted; and ports or interfaces on each blade.

The stress of these components may be aggregated together to provide an overall stress value for the network device. Similarly, the stress of multiple network devices may be aggregated together to provide a single metric for overall network stress.

EXAMPLE 3

Aggregation Strategy for Stress Values for a Plurality of Metrics in a Network Device In this example, the aggregation strategy for a given network device such as switch 7 (which may be a stacked device formed from several units) is as follows:

Step 1: The stress of each blade is determined to be the worst of:
   the blade's own monitored stress (i.e. the stress derived using measurable metrics on the blade itself); and
   the worst stress of any of the ports (or interfaces) on that blade Step 2: The stress of each unit is determined to be the worst of:
   the unit's own monitored stress; and
   the worst stress of any of the blades inserted in that unit (as determined in Step 1)

Step 3: The stress of each network device is determined to be the worst of:
   the device's own monitored stress; and
   the worst stress of any of the units which are part of the device (as determined in Step 2)

The overall stress of the network can then be determined, for example to be the worst of the stresses of all of the network objects within the network.

The overall stress of the network is thus the worst stress of any individual monitored component within the network.

EXAMPLE 4

Alterative Aggregation Strategies

Other more advanced aggregation strategies may follow the strategy of Example 3, but with the following additions:

1. For a unit or blade, also consider the effect that the bad performance of that component has on the parent component's ability to support other constituents.

For example, a blade which is under high stress may affect the performance of other blades if it congests the common, shared backplane. A unit which is under high stress may affect the performance of a network device if it congests the device's single interface onto the network.

2. For the network device, unit or blade, the stress of the component may be determined to be worse or better than just the worst of the constituent components.

For example, the stresses of the interfaces on a blade may be 60, 70 and 80. But the network management system may intelligently decide that this combination of very high stresses means that the blade itself is stressed to, say, 90. If the stresses were 10, 10 and 80, the management application may decide that this single high stress does not warrant a blade stress of 80, but perhaps only 50.

As described above, in accordance with a preferred embodiment of the present invention, the network management system monitors a plurality of stress metrics for all of the managed devices on the network, and in addition to aggregating the data for each object (e.g. device) to form an overall stress value for that object (e.g. device), the network management system may additionally aggregate together the overall object stress values of all of the network objects to provide an overall stress value for the network. Alternatively, the network management system may aggregate the worst of the underlying stresses of each of the devices, or at each network level, to provide the overall network stress values. In the latter case, the overall network stress value will represent the stress value of the least healthy device or component across the whole network.

The network management station in accordance with the invention may monitor stress periodically or in response to commands from the network manager.

As will be appreciated from the foregoing, in accordance with a preferred embodiment, the present invention is implemented in the form of a software application which may be provided in the form of a computer program on a computer readable medium. The computer readable medium may be a disk which can be loaded in the disk drive of network management station 3A or the computer system carrying the website or other form of file server (e.g. FTP) of, for example, the supplier of network devices, which permits downloading of the program by a management station over the internet.

Figure 4:
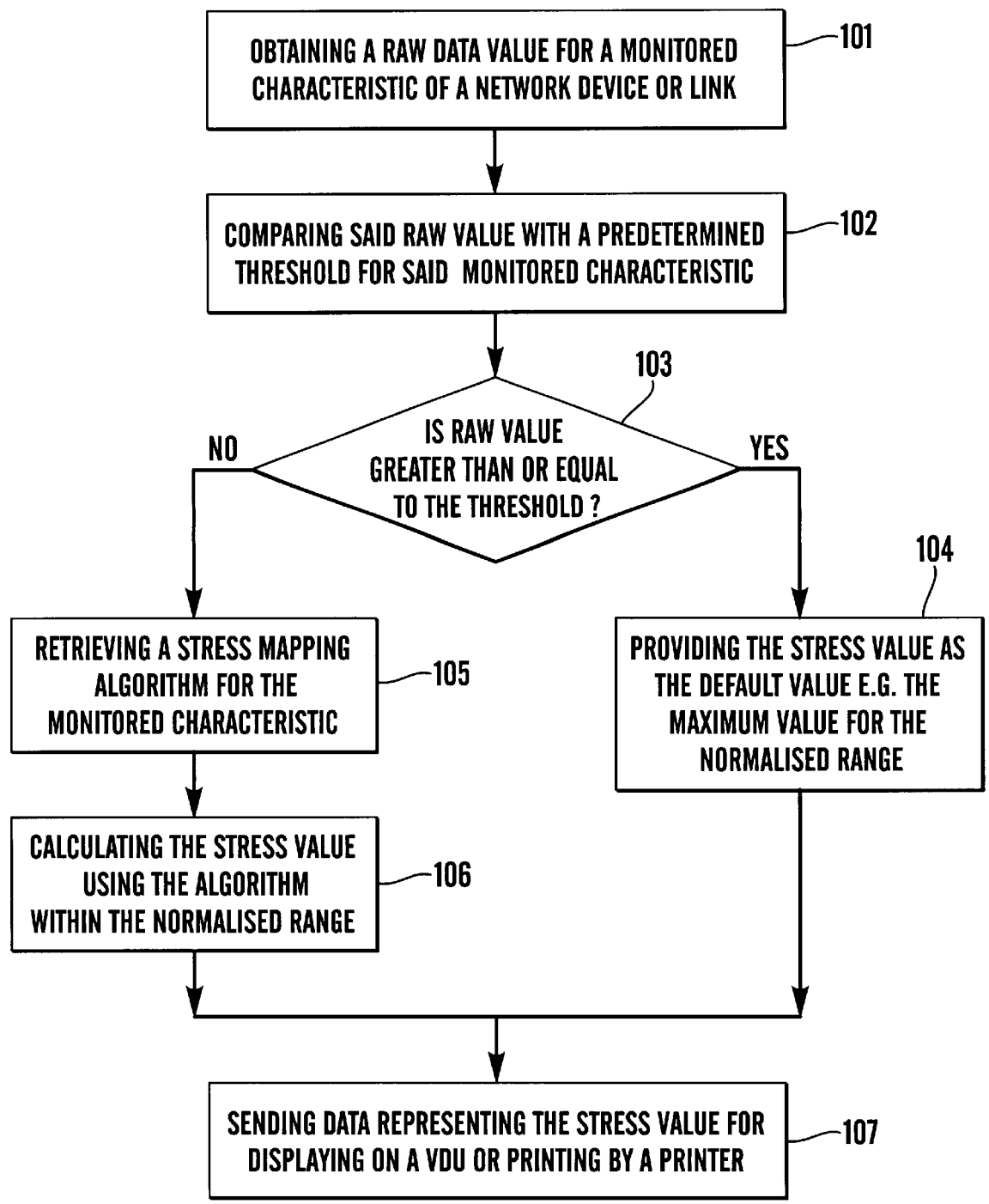
FIG. 4 is a flow chart showing the steps carried out by a computer program in accordance with a preferred embodiment of the present invention.

The program steps 101 to 107 are illustrated in FIG. 4 and have been described above.

As the skilled person will appreciate, various modifications may be made to the described embodiments and examples. For instance, as previously mentioned, if the invention is applied to determine a health value in a network, it will be appreciated that the same metrics, raw values and default thresholds will be applicable as for stress, as described above. However, the mapping algorithms will differ, and the default threshold will return the minimum value within the normalised range indicating poor health. The network manager will then need to look for low values of health to detect potential problems in the network.

The present invention is intended to include all such modifications and equivalents which fall within the scope of the present invention as defined in the accompanying claims.

What is claimed is:

1. A method for processing data representing monitored characteristics in a network comprising network devices and links to provide a stress value representing the performance of the network or a part thereof, the method comprising:
   obtaining a single raw value of data for a monitored characteristic of a network device or link;
   comparing said raw value with a predetermined threshold value for said monitored characteristic;
   if said raw value is greater than or equal to said threshold value, providing a stress value equal to a default value, said default value being a maximum or minimum value of a predefined bounded range; and
   if said raw value is less than said threshold value, calculating a stress value within said predefined bounded range using an appropriate stress mapping algorithm for said monitored characteristic, the stress mapping algorithm mapping raw values for the monitored characteristic to stress values, wherein the stress mapping algorithm provides a non-linear relationship between raw values for the monitored characteristic and stress values such that the calculated stress value represents a perceived level of stress of the network device or link indicated by the raw value for the monitored characteristic.

2. A method as claimed in claim 1, wherein said monitored characteristic relates to the port of a network device and concerns the utilisation of the link connected to the device.

3. A method as claimed in claim 2, wherein said monitored characteristic is selected from the group consisting of: link utilisation in frames per second; link error rate in frames per second; collisions per second, and broadcast frames per second.

4. A method as claimed in claim 1, wherein said step of obtaining a raw value comprises receiving said raw value from memory in a network device.

5. A method as claimed in claim 1, wherein said step of obtaining a raw value comprises receiving data values from memory in a network device, and calculating said raw value for said monitored characteristic using said data values.

6. A method as claimed in claim 1, wherein said monitored characteristic relates to the operating speed of hardware within a network device.

7. A method as claimed in claim 6, wherein said monitored characteristic is selected from the group consisting of: IP Ping response time; DNS response time: FTP response time; HTTP response time; POP3 response time; SMTP response time, and NFS response time.

8. A method as claimed in claim 6, wherein said step of obtaining a raw value comprises:
sending a signal to said hardware in said network device, which signal prompts a response from said hardware, and
timing the period for the response to be received;
wherein said timed time period is the raw value.

9. A method as claimed in claim 1, wherein said monitored characteristic is a characteristic relating to errors occurring in a core network device.

10. A method as claimed in claim 9, wherein said monitored characteristic is selected from the group consisting of: frames per second discarded due to excessive delay; frames per second discarded due to MTU exceeded; frames per second discarded because filtering table is full, and rate of topology changes.

11. A method as claimed in claim 9, wherein said step of obtaining a raw value comprises receiving said raw value from memory in said core network device.

12. A method as claimed in claim 1, wherein said predefined bounded range is 0 to 100, where the default value is 100 if it is the maximum value and 0 if it is the minimum value.

13. A method as claimed in claim 1, further comprising displaying said stress value as alphanumeric text or in graphical form on a display screen.

14. A method as claimed in claim 1, wherein the threshold value for the monitored characteristic is adjustable by the user.

15. A method for processing data representing monitored characteristics in a network comprising network devices and links to provide a stress value representing the performance of the network, the method comprising:
obtaining a plurality of raw values of data for one or more monitored characteristics of at least one network device or link;
comparing each raw value with a predetermined threshold value for said corresponding monitored characteristic;
for each raw value determining a stress value within a predetermined bounded range of values, wherein if said raw data value is greater than or equal to said corresponding threshold value, determining a stress value equal to a default value, said default value being either the maximum or minimum value of said predefined bounded range; and if said raw value is less than said threshold value, calculating a stress value within said predefined bounded range using an appropriate stress mapping algorithm for said monitored characteristic, each stress mapping algorithm mapping raw values for the monitored characteristic to stress values, such that the calculated stress value represents a perceived level of stress of the relevant network device or link indicated by the raw value for the monitored characteristic, wherein one or more of the stress mapping algorithms provides a non-linear relationship between raw values for the monitored characteristic and stress values.

16. A method as claimed in claim 15, further comprising aggregating the stress values obtained for each of said plurality of monitored characteristics to provide an aggregated stress value.

17. A computer readable medium containing a computer program for carrying out the method as claimed in claim 1.

18. A computer readable medium containing a computer program for carrying out the method as claimed in claim 15.

19. Apparatus for processing data representing monitored characteristics in a network comprising network devices and links to provide a stress value representing the performance of the network, the apparatus comprising:
a network connection or port for receiving a single raw value of data for a monitored characteristic of a network device or link;
a processor for comparing said raw value with a predetermined threshold value for said monitored characteristic obtained from memory; and if the comparison determines that raw data value is greater than or equal to said threshold value, providing a stress value equal to a default value, said default value being a maximum or minimum value of a predefined bounded range; and if the comparison determines that said raw value is less than said threshold value, calculating a stress value within said predefined bounded range using an appropriate stress mapping algorithm for said monitored characteristic stored in memory, the stress mapping algorithm mapping raw values for the monitored characteristic to stress values, wherein the stress mapping algorithm provides a non-linear relationship between raw values for the monitored characteristic and stress values such that the calculated stress value represents a perceived level of stress of the network device or link indicated by the raw value for the monitored characteristic.

20. Apparatus as claimed in claim 19, wherein said monitored characteristic relates to the port of a network device and concerns the utilisation of the link connected to the device.

21. Apparatus as claimed in claim 20, wherein said monitored characteristic is selected from the group consisting of: link utilisation in frames per second; link error rate in frames per second; collisions per second, and broadcast frames per second.

22. Apparatus as claimed in claim 19, wherein said apparatus obtains said raw value by receiving said raw value at said port from memory in a network device.

23. Apparatus as claimed in claim 19, wherein said apparatus obtains said raw value by receiving data values at said port from memory in a network device, and said processor calculating said raw value for said monitored characteristic using said received data values.

24. Apparatus as claimed in claim 19, wherein said monitored characteristic relates to the operating speed of hardware within a network device.

25. Apparatus as claimed in claim 24, wherein said monitored characteristic is selected from the group consisting of: IP Ping response time; DNS response time: FTP response time; HTTP response time; POP3 response time; SMTP response time, and NFS response time.

26. Apparatus as claimed in claim 25, wherein said apparatus obtains said raw value by sending a signal to said hardware in said network device, which signal prompts a response from said hardware, and timing the period for the response to be received; wherein said timed time period is the raw value used by said processor.

27. Apparatus as claimed in claim 19, wherein said monitored characteristic is a characteristic relating to errors occurring in a core network device.

28. Apparatus as claimed in claim 27, wherein said monitored characteristic is selected from the group consisting of: frames per second discarded due to excessive delay; frames per second discarded due to MTU exceeded; frames per second discarded because filtering table is full, and rate of topology changes.

29. Apparatus as claimed in claim 27, wherein said apparatus obtains said raw value by receiving said raw value at said port from memory in said core network device.

30. Apparatus as claimed in claim 27, wherein said apparatus obtains said raw value by receiving data values at said port from memory in a network device, and said processor calculating said raw value for said monitored characteristic using said received data values.

31. Apparatus as claimed in claim 19, wherein said predefined bounded range is 0 to 100, where the default value is 100 if it is the maximum value and 0 if it is the minimum value.

32. Apparatus as claimed in claim 19, further comprising a display for receiving said stress value from said processor and displaying said stress value as alphanumeric text or in graphical form.

33. Apparatus as claimed in claim 19, further comprising memory to store said predetermined threshold value.

34. Apparatus as claimed in claim 33, further comprising means for writing a threshold value for a monitored characteristic to said memory.

35. Apparatus as claimed in claim 19, wherein said apparatus is capable of obtaining a plurality of raw values of data for a corresponding plurality of monitored characteristics of a network device or link at said port, and said processor is adapted to compare each raw value with a predetermined threshold value for said corresponding monitored characteristic retrieved from memory, and for each raw value determining a stress value within a predetermined bounded range of values, wherein if said raw data value is greater than or equal to said corresponding threshold value, determining a stress value equal to a default value, the default value being either a maximum or minimum value of said predefined bounded range; and if said raw value is less than said threshold value, calculating a stress value within said predefined bounded range using an appropriate algorithm for said monitored characteristic, the processor thereby providing a plurality of stress values corresponding to said plurality of raw values.

36. Apparatus as claimed in claim 35, wherein said processor if further adapted to aggregate the plurality of stress values for each of said plurality of monitored characteristics to provide an aggregated stress value.

37. A computer program on a computer readable medium, the program for use in a network management system and comprising:

program means for obtaining a single raw value of data for a monitored characteristic of a network device or link;

program means for comparing said raw value with a predetermined threshold value for said monitored characteristic;

program means for providing a stress value equal to a default value, in response to said comparison determining that the raw value is greater than or equal to said threshold value, wherein said default value is a maximum or minimum value of a predefined bounded range; and program means for calculating a stress value corresponding to said raw data value, within said predefined bounded range, in response to said comparison determining that the raw value is less than said threshold value;

wherein the stress mapping algorithm maps raw values for the monitored characteristic to stress values, and wherein the stress mapping algorithm provides a non-linear relationship between raw values for the monitored characteristic and stress values such that the calculated stress value represents a perceived level of stress of the network device or link indicated by the raw value for the monitored characteristic.

38. A method as claimed in claim 1, wherein the non-linear relationship is such that the rate of increase in stress value with raw value is greater as the raw value approaches the threshold value.

39. Apparatus as claimed in claim 19, wherein the non-linear relationship is such that the rate of increase in stress value with raw value is greater as the raw value approaches the threshold value.

40. A method as claimed in claim 15, wherein the non-linear relationship is such that the rate of increase in stress value with raw value is greater as the raw value approaches the threshold value.

41. A computer program as claimed in claim 37, wherein the non-linear relationship is such that the rate of increase in stress value with raw value is greater as the raw value approaches the threshold value.

* * * * *